United States Patent Office 3,537,816
Patented Nov. 3, 1970

3,537,816
PROCESS FOR REDUCING THE ALKALI METAL CONTENT OF FAUJASITE TYPE CRYSTALLINE ZEOLITES
Leo Moscou, Castricum, Netherlands, assignor to Koninklijke Zwavelzuurfabrieken v/h Ketjen N.V., Amsterdam, Netherlands, a corporation of Netherlands
No Drawing. Filed Sept. 27, 1968, Ser. No. 763,389
Claims priority, application Netherlands, Oct. 2, 1967, 6713340
Int. Cl. G01b 33/28
U.S. Cl. 23—112                                    10 Claims

ABSTRACT OF THE DISCLOSURE

A crystalline alumino-silicate of the faujasite type, for example of the species thereof which have been referred to as zeolite X and zeolite Y, and which has had its alkali metal content reduced by one or more base exchange procedures with an aqueous solution containing rare earth metal ions with or without hydrogen ions and/or ammonium ions to partly replace the alkali metal ions, has its alkali metal content further reduced by being suspended in water together with a water-insoluble cation exchange resin in the hydrogen and/or ammonium form in such relative amounts that the equivalence ration of $H^+$ and/or $NH_4^+$ ions in the cation exchange resin and the $Na^+$ or other alkali metal ions in the alumino-silicate is within the range of from 2 to 100, with the concentration of alumino-silicate in the suspension being within the range of from 1 to 20 wt. percent, and by stirring the suspension thus obtained at a temperature within the range of from 10 to 90° C. for a time within the range of from 15 to 300 minutes, whereupon the alumino-silicate of reduced alkali metal content is separated from the cation exchange resin.

SPECIFICATION

The invention generally relates to a process for removing alkali metal ions from a crystalline alumino-silicate of the faujasite type, and is particularly directed to the removal of the alkali metal ions, by replacement thereof by hydrogen ions and/or hydrogen ion precursors, such as ammonium, with the aid of cation exchange resins in the hydrogen and/or ammonium form.

The crystalline alumino-silicates to which the present invention relates are the products generally designated as molecular sieves or crystalline zeolites, and the invention relates particularly to the synthetic crystalline zeolites of the faujasite type, some species of which have been designated as zeolite X and zeolite Y, as in U.S. Pat. No. 2,882,244; and in U.S. Pat. No. 3,130,007, respectively.

The composition of these zeolites in their alkali metal form can generally be expressed in terms of mole ratios of oxides as follows:

$$M_2O \cdot Al_2O_3 \cdot wSiO_2 \cdot yH_2O$$

where M is an alkali metal ion.

The sodium form of so-called zeolite X has the formula
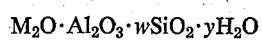
$$(0.9 \pm 0.1)Na_2O \cdot Al_2O_3 \cdot (2.5 \pm 0.5)SiO_2 \cdot 6-7H_2O$$

and the sodium form of so-called zeolite Y has the formula $$(0.9 \pm 0.2)Na_2O \cdot Al_2O_3 \cdot (3-6)SiO_2 \cdot 0-9H_2O$$

These zeolites have a uniform pore structure with openings of an effective diameter of from about 6 to 15 A.

The described alumino-silicates are useful as catalysts and/or catalyst promotors, in many cases being embedded in a matrix of silica, alumina, magnesia, silica-alumina and the like, particularly as catalysts for hydrocarbon conversion reactions, such as the cracking of hydrocarbons whereby hydrocarbon oils with a high boiling point range are converted to hydrocarbons with a lower boiling point range.

It is known that, for the application of alumino-silicates as cracking catalysts, it is desirable to have the alkali metal content of the zeolites as low as possible. A high alkali metal content undesirably favors the deposition of carbon on the cracking catalysts, so that the catalyst has to be regenerated more frequently. Further, a high alkali metal content reduces the thermal structural stability, and the effective life-time of the catalyst will be impaired as a consequence thereof. This deleterious effect of the alkali metal content has been described, for example, in the Netherlands patent application No. 266,989, wherein it is proposed to reduce the alkali metal content by a so-called base exchange procedure, in which the zeolites are repeatedly or continuously contacted with aqueous solutions of salts or other compounds to effect the exchange of the alkali metal ions in the aluminosilicate by the cations in the aqueous solution. Alkali metal ions can be replaced in this way by calcium, magnesium, hydrogen and/or hydrogen precursors such as ammonium. It is also known in the art to advantageously replace the alkali metal ions in this way by rare earth metal ions, for example, as disclosed in the Netherlands patent application No. 296,167. The presence of rare earth metal ions in the zeolite improves the structural stability of the zeolite and imparts to the zeolite increased resistance to loss of crystallinity.

However, the base exchange procedures for reducing the alkali metal content of zeolites are very time-consuming. Moreover, when these exchange techniques are applied to zeolites of the faujasite type, and particularly of the so-called zeolite type Y, the alkali metal content—usually the sodium content—cannot be brought below a certain level. Such minimum level or value of the alkali metal content is, in the case of zeolite X, about 10% of the alkali metal content of the zeolite in its alkali metal form, and, in the case of zeolite Y, is about 20 to 25% of that in the alkali metal form. This minimum value depends on the concentration of the ions in the aqueous exchange solution, the temperature of exchange and the number of exchange steps. It is known that this barrier to reduction of the alkali metal content can be broken by calcining the zeolite. When the zeolite is subjected to a base exchange with an aqueous solution containing the cation to be introduced in the zeolite as a replacement for alkali metal ions, and is calcined thereafter before being again subjected to a base exchange with an aqueous solution containing the desired cation to be introduced, the alkali metal content of the zeolite can be reduced almost unrestrictedly to any desired minimum value, for example, as disclosed in the Netherlands patent applications No. 6,607,456 and No. 6,610,653.

As stated before, the alumino-silicate is preferably base exchanged with a solution containing rare earth metal cations so as to make the zeolite particularly suitable for use as a cracking catalyst or as a promoter therefor. In this base exchange procedure the zeolite is contacted with an aqueous solution of rare earth metal (RE) salts, usually RE-chlorides, predominantly containing the chlorides of Ce, La, Nd and Pr and, in addition thereto, small amounts of the chlorides of Sm, Gd and Y, or with an aqueous solution of "didymium chloride" (a mixture of RE-chlorides with low Ce-content). These aqueous solutions may also contain hydrogen ions and/or ammonium, so that part of the alkali metal ions in the zeolite is replaced by hydrogen and/or ammonium (ammonium is a hydrogen precursor, that is, convertible in hydrogen by an aftertreatment, for example, by heating). The zeolite can also be base exchanged first with an aqueous solution of RE salts and thereafter with a solution containing hydrogen and/or ammonium ions.

However, no matter how these base exchanges are conducted, it is not possible in this way, and in the absence of calcining, to reduce the sodium content of, for example, a sodium alumino-silicate of the so-called type zeolite Y having a sodium content calculated as $Na_2O$ of about 14.7 wt. percent to below a level of about 3–3.5 wt. percent.

Accordingly, it is an object of the present invention to provide a process for reducing the alkali metal content of crystalline alumino-silicates of the faujasite type such as, the so-called zeolite X or zeolite Y, to any desired minimum level without calcining.

In accordance with this invention, a crystalline alumino-silicate of faujasite type, such as, the so-called zeolite X or zeolite Y which has had its sodium content reduced by the usual base exchange procedure with an aqueous solution containing RE-ions, is contacted in finely divided form in aqueous suspension with a water-insoluble cation exchange resin in the hydrogen and/or ammonium form. It has been found that, when the zeolite previously treated by the usual base exchange procedure and the cation exchange resin are suspended in water in such relative amounts that the equivalence ratio of the hydrogen and/or ammonium ions in the exchange resin and the sodium or other alkali metal ions in the zeolite is between 2 and 100 and the suspension contains between 1 and 20 wt. percent of zeolite, the sodium or other alkali metal content of the zeolite can be reduced to practically any desired minimum level without any calcining and without loss of crystallinity.

For example, the sodium content of an alumino-silicate of the so-called type zeolite Y having a $Na_2O$ content of 3.4 wt. percent and a $RE_2O_3$ content of 14.7 wt. percent can be reduced with the process according to the invention to less than 0.3 wt. percent of $Na_2O$ and even to less than 0.1 wt. percent without loss of crystallinity.

The cation exchange resins that can be used in the present process may be of the strongly acidic type, of the weakly acidic type or of any intermediate type. Such cation exchange resins are well known materials, for example, the copolymerisation products of styrene and divinyl benzene which have been further treated with suitable acids to provide the hydrogen form of the resin. Commercially available materials include, for example, IMAC C12, IMAC C16P and IMAC Z5, produced by Industrieele Maatschappij Activit N.V., Amsterdam, the Netherlands; Amberlite IRC 120 and Amberlite 200, produced by Rohm & Haas Co., Philadelphia, Pa., U.S.A.; Dowex-50, produced by Dow Chemical Co., Midland, Michigan, U.S.A.; and Lewatit S 100, produced by Farbenfabrik Bayer A. G., Leverkussen, Germany.

Preferably, use is made of a strongly acidic cation exchange resin in the hydrogen and/or ammonium form, such as IMAC C16P, which is a high capacity, strongly acidic nuclear sulfonic acid type cation exchange resin.

The form of the exchanger that is employed, that is, the hydrogen form, the ammonium form or an intermediate form, depends on various circumstances. Preferably, the hydrogen form is employed as this form leads to the desired result in the fastest and most direct way. It is known that the resistance of crystalline alumino-silicates against the deleterious action of acids on the skeleton generally depends on the $SiO_2/Al_2O_3$-ratio in the alumino-silicate, the sodium content and the percentage of multivalent ions already introduced by exchange of alkali metal ions.

In the well known base exchange procedure with aqueous solutions containing ions to be introduced into the zeolite, an alumino-silicate of the type zeolite X in the sodium form cannot withstand solutions of a pH below about 4.5. For alumino-silicates of the type zeolite Y, thus for higher $SiO_2/Al_2O_3$-ratios in the zeolite, the lowest admissible pH is about 2. Where the sodium content has already been reduced, for instance by base exchange of sodium ions for rare earth metal ions, solutions with lower pH-values are admissible without giving rise to loss of crystallinity of the zeolite. The crystalline structure of zeolite X in its pure sodium form collapses in an aqueous solution with a pH of 2.8; zeolite X with a $Na_2O$ content of 4 wt. percent can withstand acidic solutions with a pH of 2.8 and higher; whereas zeolite X with a $Na_2O$ content of 1.3 wt. percent can be contacted with aqueous solutions with a pH of 2 without loss of crystallinity.

In the process according to the present invention, the situation is different in that the zeolites are not treated with solutions containing free acid but are treated with ion exchanger paricles suspended in water. Regardless of the form of the ion exchanger (the hydrogen or the ammonium form) the pH of the aqueous medium will be about 7. Under certain extreme conditions of high temperature, high sodium content and low content of stabilizing multivalent ions in the zeolite, and long contact time, the surface contact of the cation exchange resin particles in the hydrogen form with the zeolite particles may lead to a loss of crystallinity. In that case, the ammonium form of the ion exchanger is preferred.

It is known that cation exchange resins show a higher affinity to multivalent cations than to monovalent cations. In the process according to the invention, wherein alumino-silicates containing multivalent and monovalent exchangeable cations are contacted with cation exchange resins containing monovalent ions, the monovalent cations of the zeolite are selectively replaced by the monovalent cations of the ion exchanger. The multivalent RE-ions of the zeolite are not at all, or for the most part are not replaced. It was found further that contacting in an aqueous medium, an alumino-silicate in its sodium form with a cation exchange resin loaded with RE-ions did not achieve any exchange.

This appears to be contrary to the disclosure in U.S. Pat. No. 3,369,865 in which it is asserted that exchange did occur when the mother liquor slurry resulting from the zeolite preparation and containing the zeolite crystals in the sodium or other alkali metal form is contacted with a cation exchange resin containing the desired cation, which may be a rare earth metal, to be introduced into the crystalline zeolite. However, it should be noted that even with the process as disclosed in U.S. Pat. No. 3,369,865, as in other existing processes mentioned herein, the sodium or other alkali metal content of the crystalline zeolite that results cannot be reduced much below 4.0 wt. percent; whereas the process according to this invention makes it possible to reduce the $Na_2O$ content of crystalline zeolite to as little as 0.1 wt. percent without loss of crystallinity and without resort to calcining.

As stated before, the equivalence ratio of $H^+$ and/or $NH_4^+$ in the amount of cation exchanger and $Na^+$ in the amount of zeolite is chosen to be between 2 and 100. Although a high equivalence ratio will lead, in a very short time of contact, to a desired reduction of the sodium content, such high ratios may result in an inadmissible loss of crystallinity of the zeolite. The choice of the ratio in a particular case will depend on the temperature of the exchange, the time of contact, the $Na_2O$ content and the $SiO_2/Al_2O_3$-ratio of the zeolite. In some cases it may be preferred to choose a low ratio, and to repeat the exchange procedure two or more times with fresh cation exchanger at the same low equivalence ratio.

The temperature of the exchange procedure is chosen to be between 10 and 90° C. and the time or contact is chosen to be between 15 and 300 minutes. It will be clear that higher temperatures will generally correspond with shorter contact times. Temperatures at which the treatment will give rise to a loss of crystallinity of the zeolite must be avoided, of course. In such cases, the use of a lower temperature can be compensated for by a longer contact time and/or a higher equivalence ratio, as defined above. Above 90° C. the loss of crystallinity will generally be inadmissibly high.

The amount of water in the suspension is not critical, but is chosen so that a good stirrable suspension of zeolite and ion exchanger is obtained. The amount of zeolite in the suspension is chosen to be between 1 and 20 wt. percent (dry basis), the lower percentages in general being preferred at higher equivalence ratios (as defined above) and the reverse.

Both solid substances, that is, the zeolite and cation exchanger, can be brought in contact in water in various ways. The process can be conducted batchwise, or continuously.

In the case of a continuous process, separate suspensions of ion exchangers and zeolite are fed simultaneously to a column, preferably to flow upwardly therein, while providing for a thorough mixing during the transport through the column. The length of the column and the velocity of transport determine the time of contact.

The separation of both substances after the exchange procedure can also be accomplished in various ways. The alumino-silicate crystals as normally produced by known preparation techniques have a particle size below 40 microns. Ion exchangers normally have a much greater particle size. By using a cation exchange resin with particles above 300 microns in size, the solid substances of the suspension can be separated simply by screening with a sieve of appropriate mesh-size, for instance, a sieve with openings of about 200 microns. In the continuous procedure, both substances can be separated, for instance, by making use of the difference in size and density of the zeolite crystals and of the cation exchange resin particles, so that, in the upflow technique, by a proper adjustment of the transport speed the zeolite crystals are carried away by the liquid and the cation exchange resin remains in the column.

The crystalline alumino-silicate which has had its alkali metal content reduced by a normal base exchange with RE-ions is preferably washed with water before the treatment with the cation exchange resins in order to remove water-soluble ions adhering to the zeolite crystals after the separation of the crystals from the base exchange solution.

In the present process one can start with the washed filter cake resulting from the base exchange procedure with an aqueous RE-ions containing solution, which filter cake has eventually been dried in the usual way.

How important a low sodium content of crystalline alumino-silicates is for the catalytic properties of cracking catalysts containing these alumino-silicates may be illustrated by comparison of the activities of cracking catalysts wherein alumino-silicates with different sodium contents have been embedded.

A crystalline alumino-silicate of the type zeolite Y having a $RE_2O_3$ content of 18.4 wt. percent was embedded in finely divided form in an amorphous silica-alumina-matrix (87 wt. percent $SiO_2$; 13 wt. percent $Al_2O_3$) in an amount of 3.5 wt. percent. The activity of the cracking catalyst obtained was determined relative to the activity of the matrix (=100). The sole matrix and the zeolitic cracking catalyst were steamed at 745° C. for 17 hours. Thereafter the catalytic efficiency was determined by cracking of a Mid-Continent gas-oil with a boiling point range of 272–405° C. The activity is the ratio of the WHSV (weight hour space velocity) of the catalyst to be tested and the WHSV of the standard catalyst at equal conversion.

$$\text{Conversion in \%} = \frac{\text{(weight feed)-weight of all fractions above 204° C, B.P.}}{\text{weight feed}} \times 100$$

The results of such activity determinations of zeolitic cracking catalysts with different sodium contents in the embedded zeolite are shown in the following table:

| Wt. percent $Na_2O$ in zeolite: | Activity |
|---|---|
| 1.9 | 330 |
| 0.6 | 350 |
| 0.3 | 450 |

For the sake of completeness it is to be noted that the $Na_2O$ contents of the zeolite mentioned in the table correspond with $Na_2O$ contents of the zeolitic cracking catalyst of 0.07 wt. percent, 0.02 wt. percent and 0.01 wt. percent respectively (assuming the sodium content of the matrix is zero.

The following examples will illustrate processes according to the invention which is, of course, not limited to such specific examples.

EXAMPLES 1–6

20 grams (on dry basis) of a synthetic crystalline alumino-silicate of the faujasite type, more particularly a so-called zeolite Y, having a silica-to-alumina mole ratio of 5.2, a sodium oxide ($Na_2O$) content of 3.7 wt. percent and a rare earth metals oxide ($RE_2O_3$) content of 14.5 wt percent, and which was obtained by the usual base exchange procedure on the zeolite in its sodium form with an aqueous solution of rare earth chloride, was suspended in finely divided form (particle size below 10 microns) in water at 80° C. together with 25 ml. of a swollen strongly acidic cation exchange resin (IMAC C16P) in the hydrogen form (exchange capacity 2000 meq. per liter; particle size above 300 microns). The total volume of the aqueous suspension was 200 ml. The equivalent ratio of hydrogen in the cation exchanger to sodium in the zeolite was about 2. The suspension was agitated by stirring at 80° C. for about half an hour. The cation exchanger was separated from the alumino-silicate suspension by sieving with a sieve having openings of 210 microns, and the aluminosilicate was filtrated off, washed with water and dried.

The sodium and rare earth content of the obtained alumino-silicate, on dry basis, was determined. Of the obtained alumino-silicate the relative X-ray-crystallinity was determined with respect to the starting material. The experiment was repeated 5 times at the same temperature, every time with 20 grams (on dry basis) of the starting zeolite Y material, but with different quantities of cation exchanger and/or of water and/or with different contact times. The data and the results of these 6 experiments are shown in Table A.

TABLE A

|  | A | B | C | D | $Na_2O$, wt. percent | $RE_2O_3$, wt. percent | R |
|---|---|---|---|---|---|---|---|
| SM | | | | | 3.7 | 14.5 | 100 |
| Ex. 1 | 25 | 2 | 0.5 | 200 | 2.19 | 14.3 | 101 |
| Ex. 2 | 25 | 2 | 5 | 200 | 2.15 | 14.8 | 100 |
| Ex. 3 | 75 | 6 | 1 | 590 | 1.02 | 14.6 | 112 |
| Ex. 4 | 75 | 6 | 2 | 590 | 0.85 | 14.6 | 108 |
| Ex. 5 | 124 | 10 | 1 | 975 | 0.72 | 14.4 | 103 |
| Ex. 6 | 125 | 10 | 2 | 975 | 0.51 | 14.6 | 105 |

A=number of ml. of swollen strongly acidic cation exchanger per 20 grams of alumino-silicate on dry basis.
B=equivalence-ratio between $H^+$ in the exchanger and $Na^+$ in the alumino-silicate.
C=contact time in hours.
D=total volume of the suspension.
R=X-ray crystallinity (relative).
SM=starting material.

The relative X-ray crystallinity was based on the net sum of the integrated intensities of all diffraction peaks in the X-ray powder diagram, obtained with $CuK_\alpha$-rays and with Bragg angles ($2\theta$) between 9.5 and 34.5 degrees. The net sum of the starting material was put at 100 for comparison. Before the determination, the samples were dried for 2 hours at 120° C. "Net sum" means: corrected for background radiation.

It is clear from these examples that the process according to the invention effects, in an easy way, a decrease of the $Na_2O$ content of a zeolite of the type Y from 3.7 wt. percent to 2–0.5 wt. percent without loss of crystallinity, without a decrease of the $RE_2O_3$ content and without the use of a calcination step before the exchange procedure with the cation exchange resin.

EXAMPLE 7

In this example the sodium oxide content of a zeolite is decreased stepwise by repeating the treatment with a cation exchange resin a few times, every time with fresh exchanger.

20 grams of a synthetic crystal line alumino-silicate of the type zeolite Y having a $Na_2O$ content of 5.4 wt. percent and a $RE_2O_3$ content of 13.2 wt. percent and which was obtained by the usual base exchange procedure on the zeolite in its sodium form with an aqueous solution of rare earth salts, was suspended in water at 80° C. together with 75 ml. of swollen IMAC C16P cation exchange resin in the hydrogen form. The volume of the suspension was 600 ml. The particle sizes of the alumino-silicate and of the cation exchange resin were the same as given in Examples 1–6. The suspension was stirred at 80° C. for 1 hour. Thereafter, the zeolite was separated from the cation exchanger, as in Examples 1–6, and treated, in the same manner as described above in the present example, with 25 ml. of fresh cation exchanger for half an hour in a total volume of the suspension of 200 ml. This second exchange step was repeated two more times. After each step the $Na_2O$ content, the $RE_2O_3$ content and the crystallinity of a sample of the zeolithic material were determined. The data and the results are shown in Table B.

TABLE B

|  | A | B | C | D | $Na_2O$, wt. percent | $RE_2O_3$, wt. percent | R |
|---|---|---|---|---|---|---|---|
| SM | | | | | 5.4 | 13.2 | 100 |
| 1st step | 75 | 4.3 | 1 | 600 | 0.71 | 12.8 | 85 |
| 2nd step | 25 | 11 | 0.5 | 200 | 0.25 | 12.6 | 88 |
| 3rd step | 25 | 31 | 0.5 | 200 | 0.10 | 12.9 | 88 |
| 4th step | 25 | 77 | 0.5 | 200 | 0.1 | 13.1 | 86 |

NOTE.—The meanings of the capital letters in the column headings are the same as in Table A. This example illustrates the possibility of obtaining by the process according to the present invention an almost sodium-free, rare earth containing zeolite still having good crystallinity.

EXAMPLES 8 AND 9

In Example 8, 20 grams of a synthetic crystalline alumino-silicate of the type zeolite Y having a $Na_2O$ content of 1.94 wt. percent and a $RE_2O_3$ content of 18.5 wt. percent was treated in water at 20° C. for 1 hour with 25 ml. of IMAC C16P cation exchange resin in the hydrogen form in the same manner as described in Example 1.

In Example 9, 20 grams of the same starting material was treated likewise at 20° C. with 75 ml. of cation exchanger. The material obtained was treated again with 75 ml. cation exchanger.

The data and results are shown in Table C, wherein the meanings of the capital letters in the column headings are the same as in Table A.

TABLE C

|  | A | B | C | D | $Na_2O_3$, wt. percent | $RE_2O_3$, wt. percent | R |
|---|---|---|---|---|---|---|---|
| SM | | | | | 1.94 | 18.5 | 100 |
| Ex. 8 | 25 | 4 | 1 | 200 | 0.41 | 18.5 | 104 |
| Ex. 9: | | | | | | | |
| 1st step | 75 | 12 | 1 | 590 | 0.29 | 18.4 | 101 |
| 2nd step | 75 | 58 | 1 | 590 | 0.16 | 17.6 | 96 |

EXAMPLE 10

20 grams of a finely divided, rare earth containing crystalline alumino-silicate of the so-called zeolite Y type having a $Na_2O$ content of 3.4 wt. percent and a $RE_2O_3$ content of 14.7 wt. percent and 75 ml. of swollen IMAC C16P cation exchange resin in the hydrogen form were suspended in water at 20° C. The volume of the suspension was adjusted to 600 ml. by adding water. The suspension was stirred at 20° C. for 1 hour. Thereafter the zeolite and the exchanger were separated with the aid of a sieve.

The data and the results are shown in Table D. The meanings of the headings A,B,C,D and R are the same as in Table A. SM is the starting material; MO is the material obtained, and N is the relative crystallinity determined by the nitrogen adsorption test.

TABLE D

|  | A | B | C | D | $Na_2O$, wt. percent | $RE_2O_3$, wt. percent | R | N |
|---|---|---|---|---|---|---|---|---|
| SM | | | | | 3.4 | 14.7 | 100 | 100 |
| MO | 75 | 7 | 1 | 600 | 0.23 | 14.7 | 80 | 99 |

In this experiment not only the X-ray crystallinity was measured but also the degree of crystallinity was determined with the aid of nitrogen adsorption at −196° C. and a relative nitrogen pressure of 0.4. The nitrogen adsorption is a measure of the geometry and porosity of the alumino-silicate. The stated values in the last column under the heading N relate to the $SiO_2$-$Al_2O_3$-skeleton, and thus have been corrected for the sodium and rare earth content of the zeolite. The stated value of N for the material obtained is the relative value with respect to the value of N for the starting material, which latter value is put at 100. From a comparison of the R- and N-values, it appears that the indicated 20 percent loss in X-ray crystallinity does not mean that the geometry of the crystalline material has been disturbed to a serious extent or that the porosity has decreased. As is well known, the geometry and the porosity of zeolites play an important role in the catalytic properties of alumino-silicates.

EXAMPLE 11

The process of Example 10 was repeated with a different so-called Y type zeolite as the starting material. The data and results are shown in Table E. The meanings of the various headings are the same as in Table D.

TABLE E

| 20° C | A | B | C | D | $Na_2O$, wt. percent | $RE_2O_3$, wt. percent | R | N |
|---|---|---|---|---|---|---|---|---|
| SM | | | | | 5.4 | 11.4 | 100 | 100 |
| MO | 75 | 4.3 | 1 | 600 | 0.45 | 12.2 | 65 | 99 |

The loss of crystallinity of 35% indicated by X-ray analysis does not mean that the geometry and the porosity of the alumino-silicate are affected seriously, as can be seen by comparing the nitrogen adsorption values.

EXAMPLE 12

The process of Example 10 was repeated with a different so-called zeolite Y as the starting material. The data and the results are shown in Table F, wherein the meaning of the various letters is the same as for Table D.

TABLE F

| 20° C | A | B | C | D | $Na_2O$, wt. percent | $RE_2O_3$, wt. percent | R | N |
|---|---|---|---|---|---|---|---|---|
| SM | | | | | 6.4 | 9.4 | 100 | 100 |
| MO | 75 | 3.7 | 1 | 600 | 0.87 | 10.3 | 65 | 99 |

In Examples 1–10, the starting materials was an alumino-silicate of the so-called zeolite Y type of which the $Na_2O$ content could not be decreased farther by the usual base exchange procedure with an aqueous solution of rare earth chloride and/or ammonium chloride, unless a calcining step was introduced. In Examples 11 and 12, the starting materials were alumino-silicates of the so-called zeolite Y type that had been subjected to a base-exchange with an aqueous solution of rare earth chloride, but by which the lowest possible level of the sodium content was not yet reached. By starting with these materials in the process according to the invention, the sodium content of such materials can also be brought far below the lowest possible value of the normal base exchange procedure.

EXAMPLES 13 AND 14

In Example 13, 20 grams of a rare earth containing crystalline alumino-silicate of the so-called zeolite X type having a $Na_2O$ content of 4.25 wt. percent and a $RE_2O_3$ content of 22.75 wt. percent, and 75 ml. IMAC C16P cation exchange resin in the hydrogen form was suspended in water at 80° C. The volume of the suspension was adjusted to 600 ml. by adding water. The suspension was stirred at 80° C. for half an hour, whereafter the zeolite was collected and tested.

In Example 14, an equal quantity of the same starting material was suspended in water at 80° C. together with 75 ml. of IMAC C16P cation exchange resin in the ammonium form. The suspension was adjusted to a volume of 600 ml., and then stirred at 80° C. for 1 hour. The zeolite crystals were separated and tested.

The data and the results are shown in Table G, wherein the meanings of the column headings are the same as in Table A.

TABLE G

| | A | B | C | D | $Na_2O$, wt. percent | $RE_2O_3$, wt. percent | R |
|---|---|---|---|---|---|---|---|
| SM | | | | | 4.25 | 22.75 | 100 |
| Ex. 13 | 75 | 5.5 | 0.5 | 600 | 0.57 | 21.02 | 50 |
| Ex. 14 | 75 | 5.5 | 1 | 600 | 0.64 | 22.91 | 102 |

In Example 14 the equivalence ratio (B) is of course the ratio of $NH_4^+$ in the exchanger and $N^+$ in the zeolites From the above results it appears that under the conditions as given, the $Na_2O$ content of a rare earth containing faujasite of the so-called zeolite X type can be decreased without loss of X-ray crystallinity by treating the zeolite with a strongly acidic exchanger in the hydrogen or ammonium form.

EXAMPLES 15 AND 16

In Example 15, 20 grams of the same starting material as in Example 8 was treated with 75 ml. of strongly acidic cation exchanger in the hydrogen form at 80° C. for 1 hour in an aqueous suspension with a total volume of 600 ml. Thereafter, the zeolite was collected and tested.

In Example 16, the same exchange procedure was applied to the same starting material, but now with 75 ml. of the cation exchanger in the ammonium form.

The data and the results are tabulated below. For comparison the data and the results of Example 8 are also stated.

TABLE H

| | A | B | C | D | $Na_2O$, wt. percent | $RE_2O_3$, wt. percent | R |
|---|---|---|---|---|---|---|---|
| SM | | | | | 1.94 | 18.5 | 100 |
| Ex. 8 | 25 | 4 | 1 | 200 | 0.41 | 18.5 | 104 |
| Ex. 15 | 75 | 12 | 1 | 600 | 0.20 | 16.8 | 90 |
| Ex. 16 | 75 | 12 | 1 | 600 | 0.59 | 18.5 | 109 |

Example 15 is a repetition of the first step of Example 9, but now at 80° C. instead of 20° C. This higher temperature gives rise to some loss of X-ray crystallinity. Example 16 illustrates that at higher temperatures the ammonium form of the cation exchanger might be preferred.

The starting materials, that is, the zeolite X and zeolite Y, employed in the foregoing examples were prepared by the base exchange procedures disclosed in Netherlands patent application No. 6,610,653, filed July 28, 1966 in the name of American Cyanamid Company. More specifically, the starting materials in the specific examples hereinabove were prepared as follows:

IN EXAMPLES 1–6

233 grams of wet filter cake (L.O.I. 35 wt. percent of "Linde SK–30" (a Union Carbide type Y zeolite), having a sodium content of 14.7 wt. percent and a silica-to-alumina mole ratio of 5.2 was suspended in 410 grams of water at 50° C. 58 grams of RE-chloride-hexahydrate (with a RE content of 46 wt. percent as $RE_2O_3$) was dissolved in 110 grams of water and the solution obtained was added with stirring to the zeolite suspension. The mixture was stirred for 30 minutes at 50° C. (pH=5.8). Thereafter, the zeolite crystals were separated, washed with 250 ml. of water and washed again with 250 ml. of water, containing 1 wt. percent of RE in the form of RE-chloride. The zeolite Y obtained had a sodium oxide content of 3.7 wt. percent and a $RE_2O_3$ content of 14.5 wt. percent, as indicated in Examples 1–6.

IN EXAMPLE 10

The starting material for this example was obtained by subjecting the zeolite Y resulting from the base exchange described above with reference to Examples 1–6 to a further identical base exchange procedure using fresh RE-solution to obtain a decrease of the $Na_2O$ content from 3.7 to 3.4 wt. percent.

IN EXAMPLES 7 AND 11

The zeolite Y for these examples was obtained by the base exchange procedure described above with reference to Examples 1–6, with the exception that the final washing with 250 ml. of water containing 1 wt. percent RE in the form of RE-chloride was omitted.

IN EXAMPLES 8, 9, 15 AND 16

The starting material for these examples was obtained by the two-step base exchange procedure described above with reference to Example 10, but with the difference that, between the two base exchange steps, the product of the first base exchange was steam-calcined for 10 minutes at 650° C. Thus, Examples 8, 9, 15 and 16 illustrate that a zeolite which has had its sodium content initially reduced by two base exchanges with an aqueous RE-solution and an intermediate calcining can have its sodium content further reduced according to this invention to a very small value without resort to further calcining.

IN EXAMPLE 12

The starting material for this example was obtained by the base exchange procedure described above with reference to Examples 1–6, but with the difference that only one-half the amount of RE-chloride hexahydrate was employed, that is, 29 grams rather than 58 grams. The amount of RE-chloride hexahydrate employed for producing the starting material of Example 12 was not sufficient to reduce the sodium content to the lowest level achievable by the normal base exchange procedure without calcining.

IN EXAMPLES 13 AND 14

80 grams (on dry base) of "Linde SK–20" (Union Carbide X type zeolite) was suspended in 800 ml. of water at 55° C. A solution of 44.5 grams of $RECl_3 \cdot 6H_2O$ in 200 ml. of water was added with stirring. The suspension was stirred for 30 minutes at 55° C. (pH=5.6). The zeolite crystals were separated thereafter, washed with water and dried.

What is claimed is:
1. Process for further reducing the alkali metal content of a crystalline zeolitic alumino-silicate of the faujasite type which has had its alkali metal content previously reduced by at least one base exchange with an aqueous solution containing at least rare earth metal ions which replace part of the alkali metal ions of said crystalline alumino-silicate, comprising the steps of suspending said zeolitic alumino-silicate in water together with a water-insoluble organic cation exchange resin in the form selected from the hydrogen and ammonium forms so as to have ions selected from $H^+$ and $NH_4^+$ ions for replacement of the alkali metal ions of the alumino-silicate, the relative amounts of said alumino-silicate and said cation exchange resin in the aqueous suspension being selected to provide an equivalence ratio of the ions selected from $H^+$ and $NH_4^+$ in the cation exchange resin and of the alkali metal ions in the alumino-silicate within the range of from 2 to 100, the concentration of said alumino-silicate in said aqueous suspension being within the range of from 1 to 20 wt. percent, agitating the suspension thus obtained at a temperature within the range of from 10 to 90° C. for a time within the range of from 15 to 300 minutes, and then separating the alumino-silicate of further reduced alkali metal content from said cation exchange resin.

2. Process according to claim 1, in which said steps are repeated with respect to said alumino-silicate of further reduced alkali metal content and with fresh cation exchange resin.

3. Process according to claim 1, in which said alumino-silicate suspended in water with said cation exchange resin is in finely divided form and is of a particle size substantially smaller than the particle size of said resin.

4. Process according to claim 3, in which the separation of the alumino-silicate of further reduced alkali metal content from the cation exchange resin is effected by selective sieving thereof.

5. Process according to claim 1, in which the ions of said alumino-silicate which are to be replaced by said ions of the cation exchange resin are $Na^+$ ions.

6. Process according to claim 1, in which said crystalline zeolitic alumino-silicate is selected from the group of zeolities referred to as zeolite X and zeolite Y.

7. Process according to claim 1, in which said aqueous solution employed for each said base exchange contains ions selected from hydrogen and ammonium ions in addition to said rare earth metal ions for further replacement of part of said alkali metal ions prior to said steps.

8. Process according to claim 1, in which, prior to said steps, the alumino-silicate of reduced alkali metal content is separated from said base exchange solution and washed electrolyte-free.

9. Process according to claim 1, in which said crystalline zeolitic alumino-silicate is selected from the group consisting of zeolite X and zeolite Y, and said time is selected within said range of from 15 to 300 minutes so as to obtain reduction of the alkali metal content to substantially less than 10% of the alkali metal content of the zeolite in its alkali metal form in the case of zeolite X and to substantially less than 20% of the alkali metal content of the zeolite in its alkali metal form in the case of zeolite Y.

10. Process for further reducing the alkali metal content of a crystalline zeolitic alumino-silicate of the faujasite type having part of its alkali metal ion content replaced with rare earth metal ions comprising the steps of suspending said zeolitic alumino-silicate in water together with a water-insoluble organic cation exchange resin in the form selected from the hydrogen and ammonium forms so as to have ions selected from $H^+$ and $NH_4^+$ ions for replacement of the alkali metal ions of the alumino-silicate, the relative amounts of said alumino-silicate and said cation exchange resin in the aqueous suspension being selected to provide an equivalence ratio of the ions selected from H⁺ and NH₄⁺ in the cation exchange resin and of the alkali metal ions in the alumino-silicate within the range of from 2 to 100, the concentration of said alumino-silicate in said aqueous suspension being within the range of from 1 to 20 wt. percent, agitating the suspension thus obtained at a temperature within the range of from 10 to 90° C. for a time within the range of from 15 to 300 minutes, and then separating the alumino-silicate of further reduced alkali metal content from said cation exchange resin.

References Cited

UNITED STATES PATENTS

| | | | |
|---|---|---|---|
| 2,882,244 | 4/1959 | Milton | 23—113 |
| 3,130,007 | 4/1964 | Breck | 23—113 |
| 3,140,253 | 7/1964 | Plank et al. | 252—455 X |
| 3,369,865 | 2/1968 | Mattox et al. | 23—112 |
| 3,375,065 | 3/1968 | McDaniel et al. | 23—112 |
| 3,402,996 | 9/1968 | Maher et al. | 23—112 |

EDWARD J. MEROS, Primary Examiner